United States Patent
Yoshida

(10) Patent No.: US 9,525,815 B2
(45) Date of Patent: Dec. 20, 2016

(54) IMAGING APPARATUS, METHOD FOR CONTROLLING THE SAME, AND RECORDING MEDIUM TO CONTROL LIGHT EMISSION

(71) Applicant: CANON KABUSHIKI KAISHA, Tokyo (JP)

(72) Inventor: Nobukazu Yoshida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/528,971

(22) Filed: Oct. 30, 2014

(65) Prior Publication Data

US 2015/0156408 A1 Jun. 4, 2015

(30) Foreign Application Priority Data

Dec. 4, 2013 (JP) .................................. 2013-251247

(51) Int. Cl.
| | |
|---|---|
| H04N 5/222 | (2006.01) |
| H04N 5/232 | (2006.01) |
| H04N 5/235 | (2006.01) |

(52) U.S. Cl.
CPC ........ *H04N 5/23216* (2013.01); *H04N 5/2327* (2013.01); *H04N 5/2353* (2013.01); *H04N 5/23219* (2013.01); *H04N 5/23245* (2013.01)

(58) Field of Classification Search
CPC .. H04N 5/2256; H04N 5/2354; G06K 9/2027; G03B 15/02; G03B 15/04; G03B 7/16
USPC .................................................. 348/370, 371
See application file for complete search history.

(56) References Cited

U.S. PATENT DOCUMENTS

| | | | | |
|---|---|---|---|---|
| 7,868,944 | B2* | 1/2011 | Tanaka ...................... | G02B 7/36 348/345 |
| 7,969,504 | B2* | 6/2011 | Matsuda ................ | G03B 15/05 348/333.02 |
| 8,208,061 | B2* | 6/2012 | Cheng .................... | G03B 15/05 348/370 |
| 8,773,578 | B2* | 7/2014 | Takeuchi ............. | H04N 5/2352 348/229.1 |
| 2009/0040332 | A1* | 2/2009 | Yoshino ............... | H04N 5/2354 348/222.1 |

(Continued)

FOREIGN PATENT DOCUMENTS

JP 63-169622 A 7/1988

*Primary Examiner* — Kelly L Jerabek
(74) *Attorney, Agent, or Firm* — Canon USA, Inc. IP Division

(57) ABSTRACT

An imaging apparatus includes a light emission unit, an instruction unit, and a light emission determination unit. The light emission unit moves between a light and a non-light emission position. The instruction unit changes, in response to a user's manual operation, to a first state giving an instruction to prepare for capturing a subject's image. In response to setting the instruction unit to the first state, the light emission determination unit makes a light emission determination based on a captured scene. In response to setting the instruction unit to the first state and where the light emission determination unit determines that the light emission unit does not emit light, the light emission determination unit determines that the light emission unit emits light, in response to a user's operation for moving the light emission unit to the light emission position while the instruction unit is kept in the first state.

14 Claims, 8 Drawing Sheets

(56) References Cited

U.S. PATENT DOCUMENTS

2011/0128402 A1\* 6/2011 Lim .................... H04N 5/2256
    348/222.1
2013/0057745 A1\* 3/2013 Yoshida ............. H04N 5/23293
    348/333.01

\* cited by examiner

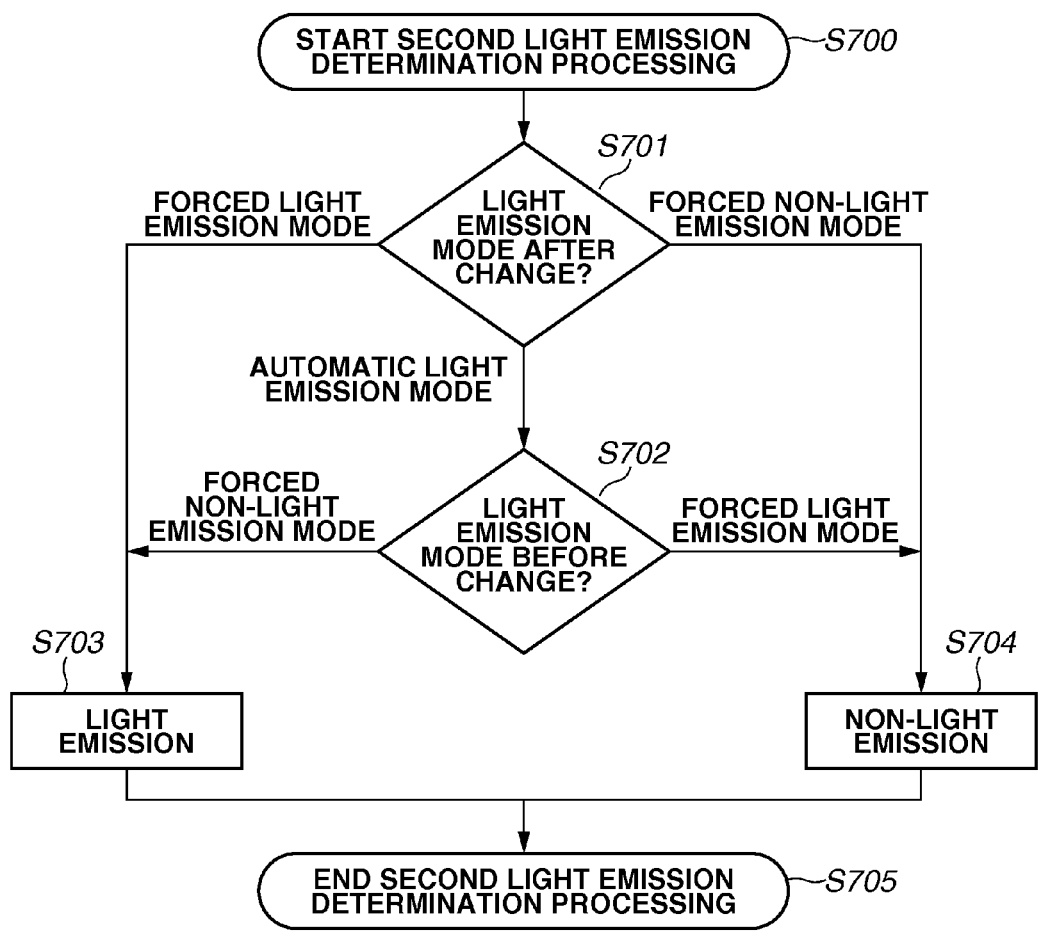

IMAGING APPARATUS, METHOD FOR CONTROLLING THE SAME, AND RECORDING MEDIUM TO CONTROL LIGHT EMISSION

BACKGROUND OF THE INVENTION

Field of the Invention

The present invention relates to an imaging apparatus for controlling emission of a light emission unit, a method for controlling the imaging apparatus, and a recording medium.

Description of the Related Art

A conventional imaging apparatus generally determines the necessity of emission of a light emission unit, such as a flash, according to the light emission mode and a captured scene at the time when capturing a subject's image (hereinafter this determination is simply referred to as light emission determination). In Japanese Patent Application Laid-Open No. 63-169622, a camera is proposed whose flash light is emitted in a case where backlight determination is performed based on the luminance of a image-capturing screen and it is determined by the determination that a main subject is in a backlight scene.

As described above, When the light emission mode in which the imaging apparatus automatically performs the light emission determination is set, the imaging apparatus determines whether to perform emission by the light emission unit according to a captured scene determined based on the subject's luminance.

SUMMARY OF THE INVENTION

According to an aspect of the present invention, an imaging apparatus includes a light emission unit configured to move between a light emission position and a non-light emission position, an instruction unit configured to change, in response to a user's manual operation, to a first state for giving an instruction to prepare for capturing a subject's image, and a light emission determination unit configured to make a light emission determination, wherein, in response to setting the instruction unit to the first state, the light emission determination unit makes the light emission determination based on a captured scene, and wherein, in response to setting the instruction unit to the first state and in a case where the light emission determination unit determines that the light emission unit does not emit light, the light emission determination unit determines that the light emission unit emits light, in response to a user's operation for moving the light emission unit to the light emission position while the instruction unit is kept in the first state.

According to the claimed invention, it is possible to set the necessity of emission of a light emission unit in deference to the user's intention even in a case where an imaging apparatus automatically performs the light emission determination.

Further features of the present invention will become apparent from the following description of exemplary embodiments with reference to the attached drawings.

BRIEF DESCRIPTION OF THE DRAWINGS

FIG. 8 is a flowchart illustrating second light emission determination by the digital camera that is an imaging apparatus according to the second exemplary embodiment of the present invention.

DESCRIPTION OF THE EMBODIMENTS

Various exemplary embodiments, features, and aspects of the invention will be described in detail below with reference to the drawings.

Figure 1:
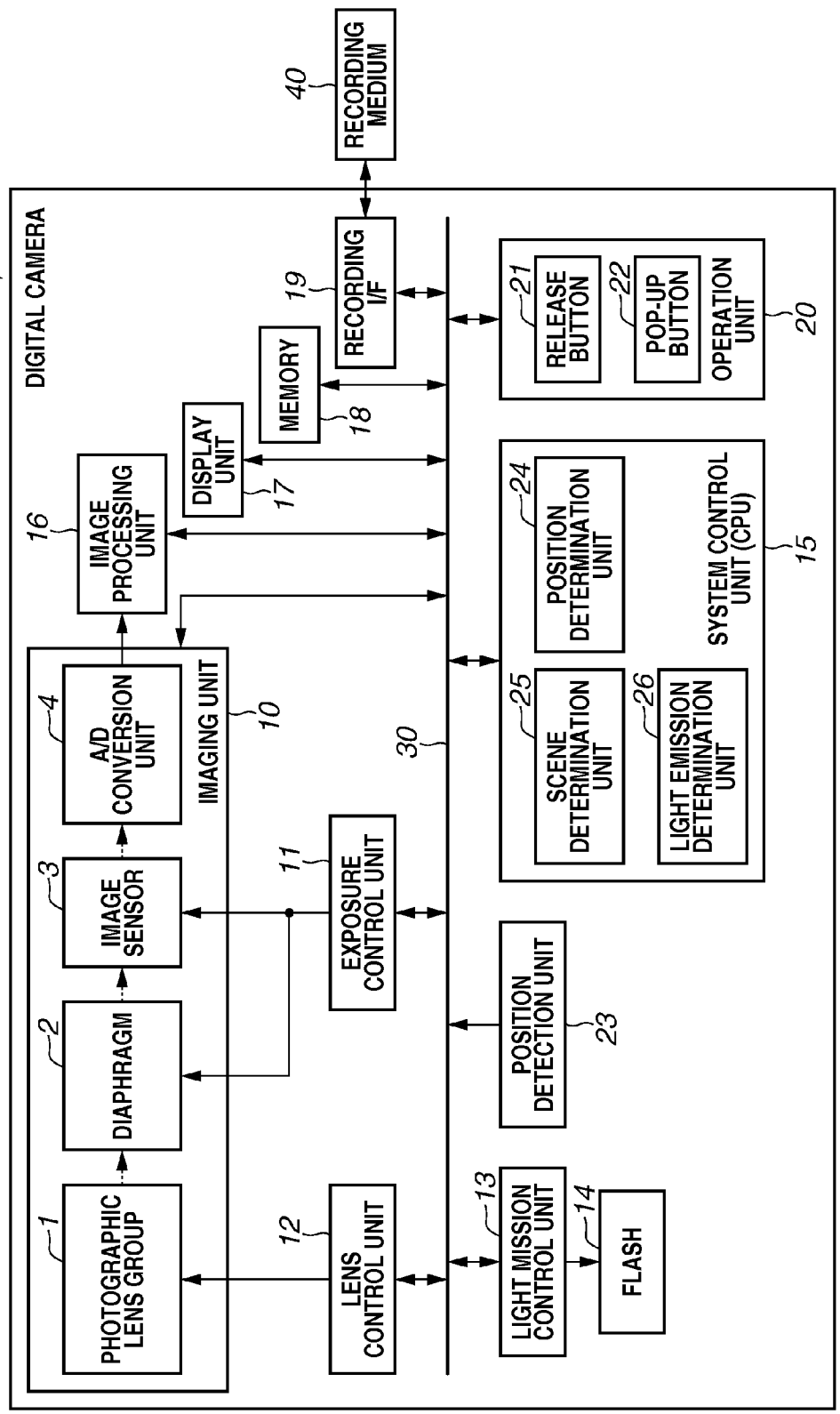
FIG. 1 is a block diagram illustrating the configuration of a digital camera that is an imaging apparatus according to a first exemplary embodiment of the present invention.

A digital camera (hereafter simply referred to as a camera) 100 that is an imaging apparatus according to a first exemplary embodiment of the present invention will be described below with reference to FIGS. 1 to 5. FIG. 1 is a block diagram illustrating the internal configuration of the camera 100 that is an imaging apparatus according to the first exemplary embodiment of the present invention. The internal configuration of the camera 100 will be described below with reference to FIG. 1.

A photographic lens group 1 is composed of a plurality of lenses including a zoom lens and a focal lens. The quantity of light which has penetrated the photographic lens group 1 is adjusted by a diaphragm 2.

A charge accumulation type image sensor 3 is composed of a solid-state image sensor such as a charge-coupled device (CCD) and a complementary metal oxide semiconductor (CMOS). An optical image of a subject passes through the photographic lens group 1 and the diaphragm 2, and is formed on the image sensor 3. The image sensor 3 performs photoelectric conversion on the optical image formed thereon, and outputs to an analog-to-digital (A/D) conversion unit 4 (described below) an analog image electrical signal according to the relevant optical image (hereinafter referred to as analog image data).

An exposure control unit 11 controls operations of the diaphragm 2, the image sensor 3, a shutter (not illustrated), and a gain adjustment unit according to an instruction from a system control unit (hereinafter referred to as a central processing unit (CPU)) 15 (described below). Therefore, the exposure control unit 11 controls the diaphragm diameter (or diaphragm value), the exposure time, and the gain amount to enable controlling the exposure amount of image data to be acquired.

A lens control unit 12 controls the drive of each lens constituting the photographic lens group 1. For example, the lens control unit 12 can control the drive of the focal lens and the zoom lens included in the photographic lens group 1.

The A/D conversion unit 4 converts the analog image data output from the image sensor 3 into a digital image electrical signal (hereinafter referred to as digital image data). In the present exemplary embodiment, the photographic lens group 1, the diaphragm 2, the image sensor 3, and the A/D conversion unit 4 that has been described above are collectively referred to as an imaging unit 10.

An image processing unit 16 performs processing, such as shading correction, color correction, contour enhancement, and pixel interpolation, on the digital image data output from the A/D conversion unit 4. The digital image data having undergone various types of processing by the image processing unit 16 is converted into a predetermined format. Then, the converted digital image data is stored in a video random access memory (VRAM) area of a memory 18 (described below) via a bus 30.

The memory 18 is a recording unit composed of recording elements, such as a random access memory (RAM). The memory 18 is connected to each unit in the camera 100 via the bus 30. The memory 18 records various types of data to be output according to the imaging processing of the camera 100. The memory 18 further prestores various types of data to be used in the present exemplary embodiment. For example, the memory 18 prestores drive timing of each unit in the camera 100, various exposure conditions, and calculation formulas to be used in processing in the camera 100. The memory 18 further stores programs for instructing the camera 100 to carry out operations similar to the flowcharts illustrated in FIGS. 2 to 5.

A recording interface (I/F) 19 is a compression coding unit for reading the digital image data recorded in the memory 18, and compressing and coding the relevant digital image data to acquire coded image data.

The recording I/F 19 can connect with a recording medium (such as a secure digital (SD) card) 40 which can be inserted into and removed from the camera 100. The coded image data processed by the recording I/F 19 is recordable in the recording medium 40 inserted into the camera 100. The recording I/F 19 further reads the coded image data recorded in the recording medium 40, and decodes and decompresses the relevant coded image data to acquire digital image data. Then, the recording I/F 19 can record the relevant digital image data in the memory 18.

A display unit 17 displays an acquired image, and icons and texts which form a user interface. A thin film transistor (TFT) composed of liquid crystal display (LCD) elements is used for the display unit 17 according to the present exemplary embodiment.

The digital image data having undergone the image processing by the image processing unit 16 is read from the memory 18 by the CPU 15 (described below), and is converted into analog image data for display (hereinafter referred to as an display image) by a digital-to-analog (D/A) conversion unit (not illustrated). Then, the CPU 15 displays the converted image on the display unit 17. The CPU 15 continuously performs the above-described operations to enable successively display the image on the display unit 17 (live view display). Further, various types of information about the camera 100, such as an exposure amount (exposing condition), information about a flash 14, and an autofocus (AF) frame in image capturing can be displayed on the display unit 17.

An operation unit 20 inputs various user operations related to operations of the camera 100. The operation unit 20 according to the present exemplary embodiment is provided with a release button 21 and a pop-up button 22 (described below).

The release button 21 is the instruction unit for instructing the camera 100 to prepare for capturing a subject's image and start capturing a subject's image. The release button 21 according to the present exemplary embodiment changes into a SW1 state (first state) and a SW2 state (second state) in response to a user's pressing operation. The release button 21 is instructing the camera 100 to prepare for capturing a subject's image in SW1 state (first state). And the release button 21 is instructing the camera 100 to start capturing a subject's image in SW2 state (second state).

When the user operates the release button 21 with a first operation amount, the release button 21 changes into (enters) the SW1 state (first state). When the user operates the release button 21 with a second operation amount which is larger than the first operation amount, the release button 21 changes into (enters) the SW2 state (second state).

In the following descriptions, the above-described first operation amount refers to the operation amount with which the user half-presses the release button 21, and the second operation amount refers to the operation amount with which the user full-presses the release button 21. Therefore, the release button 21 changes into the SW1 state when half-pressed by the user, and changes into the SW2 state when full-pressed by the user.

When the user sets the release button 21 to the SW1 state (half press), the camera 100 is instructed to prepare for capturing a subject's image, and the exposure conditions and the focus position of the focal lens are set. Further, when the user sets the release button 21 to the SW2 state (full press), the camera 100 is instructed to start capturing a still image or a moving image. The above-described start of image capturing means start of exposure of the image sensor 3.

When the user full-presses the release button 21 to instruct the camera 100 to start capturing image for obtaining a still image or a moving image, subject's imaging, A/D conversion, image processing, image recording, and image display are performed, and the acquisition and display of a still image or a moving image corresponding to the imaging are performed. An instruction for starting capturing a still image and an instruction for starting capturing for obtaining a moving image may be issued by using different instruction units.

Although, in the present exemplary embodiment, the release button 21 is used as an instruction unit, the configuration is not limited thereto. For example, a switch differently configured from the release button 21 may be used as an instruction unit. Further, the display unit 17 may be a touch panel which allows the user to input various information through touch operations, and may be used as an instruction unit. Further, the instruction unit according to the present exemplary embodiment may be any device as long as it changes into the SW1 and SW2 states in response to a user's manual operation.

A pop-up button 22 is a position change unit for giving an instruction to move the flash 14 (described below) between the non-light emission position and the light emission position by a user's manual operation. Specifically, in response to a user's operation on the pop-up button 22, a predetermined signal is output from a signal transmitting circuit (not illustrated) to the CPU 15. When the relevant predetermined signal is received, the CPU can drive a drive unit (not illustrated) to move the flash 14 from the non-light emission position to the light emission position.

The flash 14 may be configured to be locked at the non-light emission position by a latching member (not illustrated), and unlocked when the user operates the pop-up button 22. In this case, after the flash 14 is unlocked, the flash 14 moves from the non-light emission position to the light emission position.

Although, in the present exemplary embodiment, the pop-up button 22 is used as a position change unit, the configuration is not limited thereto. For example, a switch may be used as a position change unit by sliding it through a user's manual operation. In addition, the position change unit may be any device as long as it can instruct the movement of the flash 14 between the light emission position and the non-light emission position.

In addition, when the user operates the operation unit 20, various settings related to the camera 100 can be made. For example, when the user operates the operation unit 20 in a state where a menu related to the light emission mode setting is displayed on the display unit 17, the light emission mode (described below) can be set. The light emission mode can be set at any desired timing by the user.

A light emission control unit 13 controls light emission of the flash 14 (described below) based on an instruction from the CPU 15. The flash 14 is a light emission unit employing the so-called pop-up method which enables moving between the light emission position and the non-light emission position in response to a user's manual operation. The flash 14 according to the present exemplary embodiment is configured to emit light at the light emission position, to enable illuminating the subject. Further, the flash 14 cannot emit light at the non-light emission position. The light emission position is projected from the exterior of the camera 100. The non-light emission position is inside the exterior of the camera 100.

The flash 14 may be any device as long as it is movable between the light emission position and the non-light emission position. For example, the flash 14 may be a light emission unit rotatable at a predetermined position of the camera 100, and configured to be movable between the light emission position and the non-light emission position in response to a user's manual operation. Specifically, the flash 14 may be configured to move between the light emission position and the non-light emission position by using a moving method other than the pop-up method.

Although the flash 14 according to the present exemplary embodiment is configured to move between the light emission position and the non-light emission position in response to a user's operation on the pop-up button 22, the configuration is not limited thereto. For example, the flash 14 may be configured to move between the light emission position and the non-light emission position in response to a user's direct operation.

The CPU 15 comprehensively controls each unit constituting the camera 100. The CPU 15 can instruct the exposure control unit 11, the lens control unit 12, the light emission control unit 13, and the image processing unit 16 (described below) in order to control the respective units. The camera 100 may be configured in such a way that the CPU 15 controls the drive of each unit in the camera 100, without providing the above-described control units and processing unit in the camera 100. Further, the camera 100 may be configured in such a way that the above-described control units and processing unit collaborate and operate to control the drive of each unit in the camera 100, without providing the CPU 15 in the camera 100.

The CPU 15 is also a unit for performing light metering calculation based on image data acquired through imaging to calculate the subject's luminance value (luminance information). Specifically, the CPU 15 divides the inside of the angle of view of the acquired digital image data into a plurality of blocks. Then, the CPU 15 calculates the average luminance value for each block, and weights the calculated average luminance value. Then, the CPU 15 performs addition averaging on the weighted average luminance value for each block to calculate a representative luminance value. Eventually, the CPU 15 records the calculated luminance value of the subject in the memory 18. In the present exemplary embodiment, the calculated representative luminance value is used in subsequent processing as the subject's luminance value (luminance information). The method for calculating the subject's luminance value is not limited to the above-described one, and other well-known methods may be used.

In the present exemplary embodiment, the weighting coefficient for the block corresponding to the face of a person in digital image data is made larger than those for other blocks. The above-described configuration enables improving the determination accuracy for a backlight scene when determining a captured scene (described below). In addition, the weighting coefficients of blocks other than the face area may be changed according to a captured scene or the light metering mode.

The CPU 15 is also a light adjustment unit for acquiring the amount of light emission at the time when the flash 14 emits light, based on the calculated subject's luminance value. When the flash 14 emits light, the CPU 15 acquires the amount of light emission of the flash 14 based on the subject's luminance information, and transmits the information about the amount of light emission to the light emission control unit 13.

Further, the CPU 15 is provided with a position determination unit 24, a scene determination unit 25, and a light emission determination unit 26 (described below). Each determination unit will be described in detail below. Circuits equivalent to respective determination units may be provided outside the CPU 15.

Each unit constituting the CPU 15 will be described in detail below. A position detection unit 23 detects the position of the flash 14. In the present exemplary embodiment, a magnetic sensor is used as the position detection unit 23. Specifically, a small magnet is provided on the flash 14, and a magnetic sensor is provided on the periphery of the position of the camera 100 at which the flash 14 is stored. The magnetic sensor can detect the position of the flash 14 by detecting the strength and variation of the magnetic field which varies with the position of the flash 14. Information about the detected position of the flash 14 is output to the position determination unit 24 (described below).

The position detection unit 23 may be a sensor other than a magnetic sensor. The position detection unit 23 may be, for example, a switch of which the conducting state changes with the position of the flash 14.

The position determination unit 24 determines whether the position of the flash 14 is changed according to the output from the position detection unit 23. In the present exemplary embodiment, the position determination unit 24 determines whether the output from the position detection unit 23 has changed to determine whether the position of the flash 14 has been changed. Information about the determination result of the position determination unit 24 is transmitted to the light emission determination unit 26 (described below).

The position determination unit 24 may be configured to determine whether the position of the flash 14 has been changed, based on a predetermined signal output at the time when the pop-up button 22 is operated.

The scene determination unit 25 determines a captured scene based on the subject's luminance value. The result of the scene determination unit 25 is transmitted to the light emission determination unit 26 (described below). Although backlight scenes and low-luminance scenes can be determined in the present exemplary embodiment, captured scenes other than them may be determined. Captured scenes may be determined based on various conditions other than the subject's luminance value.

The light emission determination unit 26 is a determination unit about emission of light of the flash 14. In the present exemplary embodiment, the light emission determination is a determination about the light emission by flash 14 and the non-light emission of flash 14 in. The light emission determination unit 26 according to the present exemplary embodiment performs the light emission determination according to information about the light emission mode, a captured scene, and the position of the flash 14. The light emission determination will be described in detail below.

Further, the light emission determination unit 26 also controls light emission of the flash 14 based on the result of the above-described light emission determination. In the present exemplary embodiment, the light emission determination unit 26 determines whether to emit light of the flash 14 when capturing a subject's image, based on the determination result of first light emission determination or second light emission determination (described below).

The CPU 15 transmits a control signal to the light emission control unit 13 based on information about settings based on the result of the light emission determination unit 26 and on information about the amount of light emission of the flash 14. The light emission control unit 13 controls various types of operations related to the flash 14 based on the relevant control signal. The above completes descriptions of the basic configuration of the camera 100 according to the present exemplary embodiment.

Figure 2:
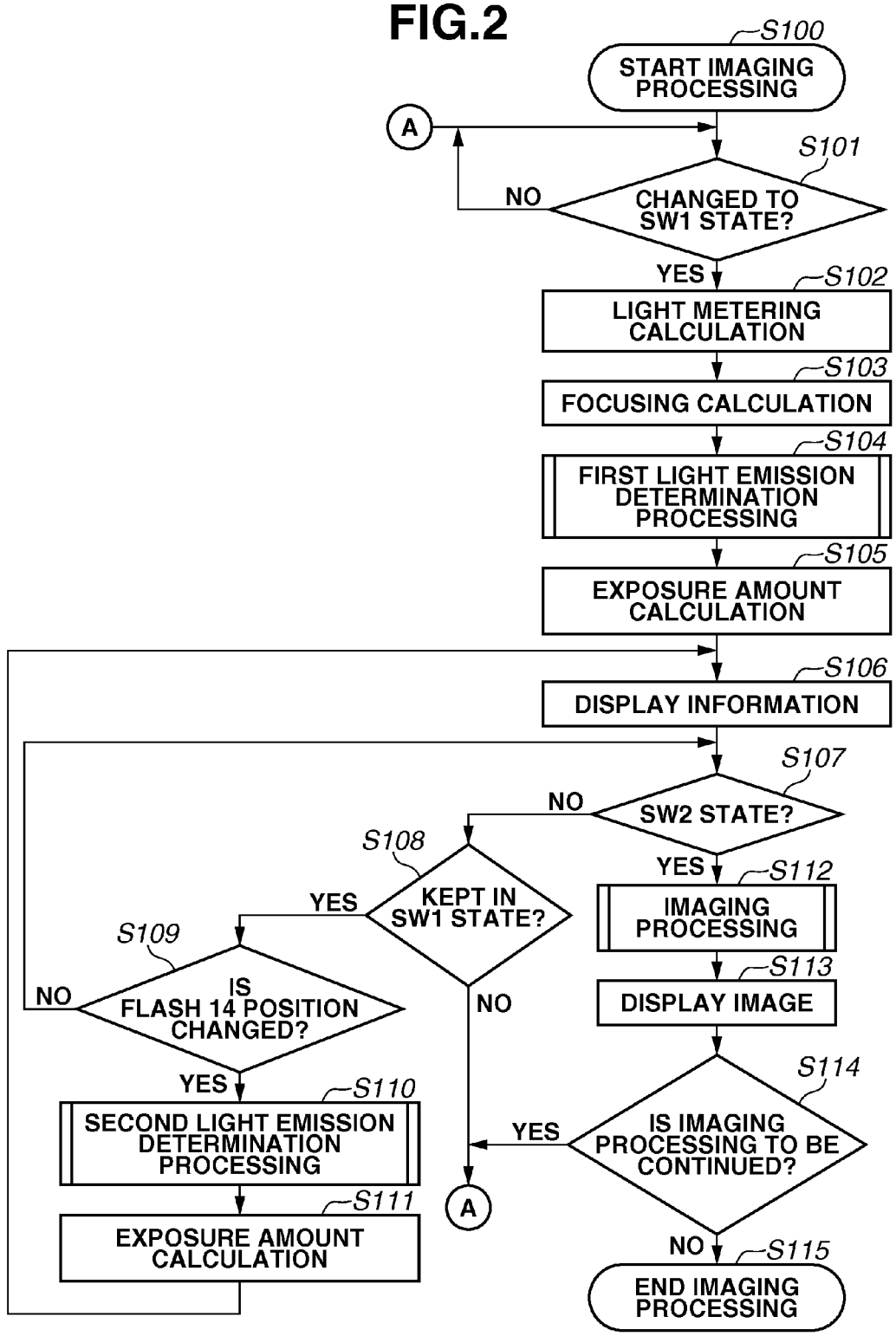
FIG. 2 is a flowchart illustrating the imaging by the digital camera that is an imaging apparatus according to the first exemplary embodiment of the present invention.

Imaging according to the first exemplary embodiment of the present invention will be described below with reference to FIG. 2. FIG. 2 is a flowchart illustrating the imaging of the camera 100 that is an imaging apparatus according to the first exemplary embodiment of the present invention.

The flowchart illustrated in FIG. 2 will be described below. In step S100, the CPU 15 starts imaging. In step S101, the CPU 15 determines whether the release button 21 has been changed to the SW1 state (half press) by a user's operation. When the CPU 15 determines that the release button 21 has been changed to the SW1 state (half press) (YES in step S101), the processing proceeds to step S102.

In step S102, the CPU 15 performs light metering calculation to calculate the subject's luminance value. The calculated subject's luminance value is recorded in the memory 18. In step S102, the CPU 15 sets an exposure amount suitable for the subject's luminance (hereinafter referred to as suitable exposure amount) based on the calculated subject's luminance value. The set suitable exposure amount is recorded in the memory 18. The exposure amount according to the present exemplary embodiment is based on the diaphragm value, the exposure time, and the gain amount at the time when obtaining the image date by capturing a subject's image.

In step S103, the CPU 15 performs focusing calculation, such as AF evaluation calculation, to calculate the focal position of the photographic lens group 1 at which the subject is set to the in-focus state. Then, the lens control unit 12 controls the drive of the photographic lens group 1 based on the calculated focal position. This operation enables setting an imaging target to the in-focus state.

In step S104, the light emission determination unit 26 performs the first light emission determination of whether to emit light of the flash 14. The first light emission determination will be described below with reference to FIG. 3.

Figure 3:
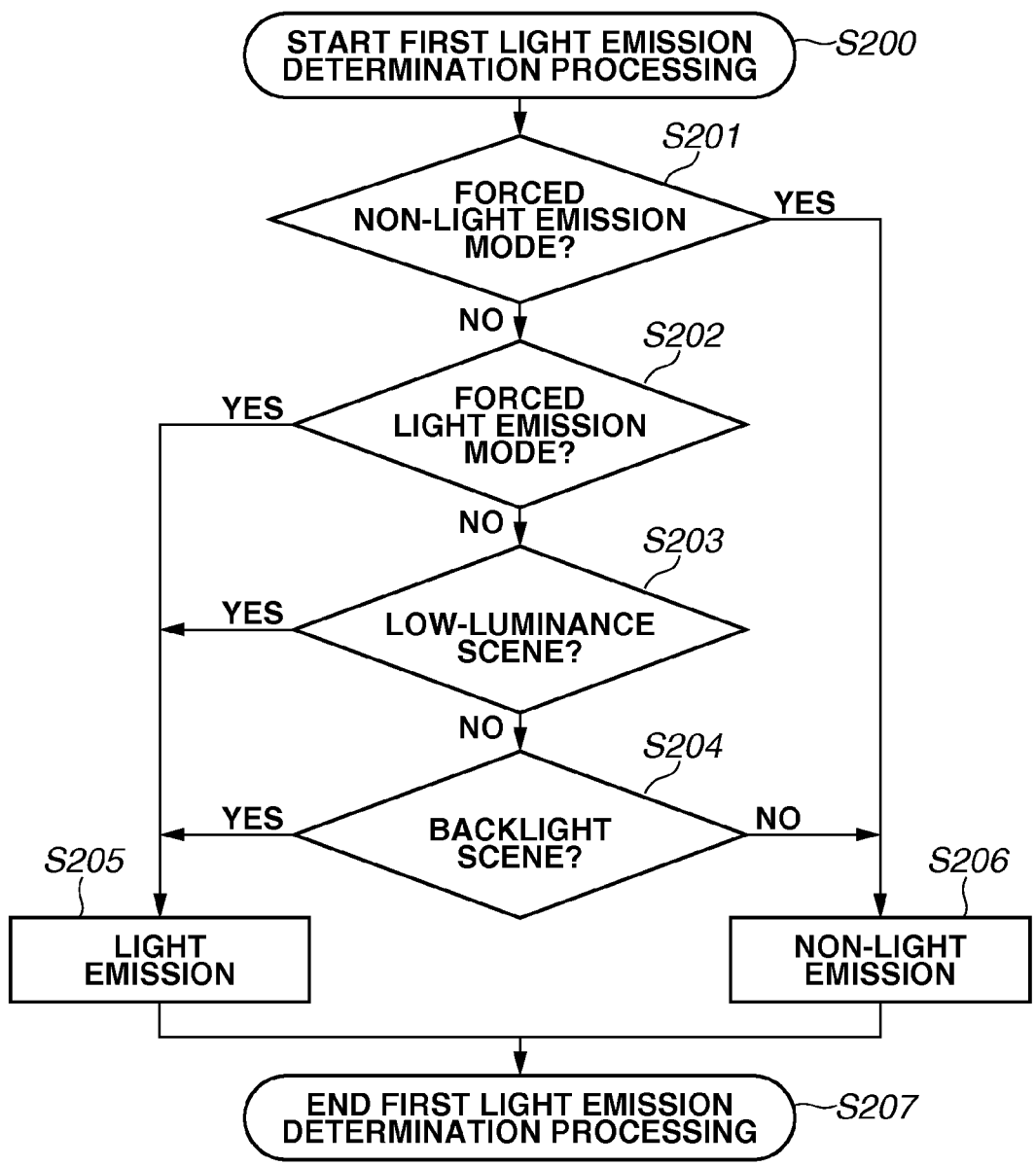
FIG. 3 is a flowchart illustrating first light emission determination by the digital camera that is an imaging apparatus according to the first exemplary embodiment of the present invention.

FIG. 3 is a flowchart illustrating the first light emission determination of the camera 100 that is an imaging apparatus according to the first exemplary embodiment of the present invention.

The flowchart illustrated in FIG. 3 will be described below. In step S200, the CPU 15 starts the first light emission determination. In step S201, the CPU 15 determines whether the preset light emission mode of the flash 14 is the forced non-light emission mode. In other words, the CPU 15 determines whether the currently set light emission mode is the forced non-light emission mode.

Light emission modes which can be set in the present exemplary embodiment will be described below. The light emission modes which can be set in the present exemplary embodiment include an automatic light emission mode, the forced light emission mode, and the forced non-light emission mode. In the automatic light emission mode (first mode), the CPU 15 automatically determines whether to emit light of the flash 14, based on a captured scene of the subject. In the forced light emission mode, the flash 14 emits light regardless of a captured scene. In the forced non-light emission mode, the flash 14 does not emit light regardless of the captured scene. The above-described forced light emission mode and forced non-light emission mode are collectively referred to as forced setting mode (second mode).

Although, in the present exemplary embodiment, the automatic light emission mode and the forced light emission mode can be set in a state where the flash 14 is set at the light emission position, the configuration is not limited thereto. For example, the flash 14 may be configured to move to the light emission position in response to setting the forced light emission mode or the automatic light emission mode. Further, the flash 14 may be configured to move to the light emission position based on the result of the first light emission determination (described below).

Assume a case where the flash 14 is set at the light emission position, and the automatic light emission mode is set. In this case, when the flash 14 is moved from the light emission position to the non-light emission position in response to a user's operation, the light emission mode is changed to the forced non-light emission mode. Then, when the position of the flash 14 is moved from the non-light emission position to the light emission position in response to a user's operation, the light emission mode is changed back to the automatic light emission mode.

Assume a case where the flash 14 is set at the light emission position and the forced light emission mode is set. In this case, when the flash 14 is moved from the light emission position to the non-light emission position in response to a user's operation, the light emission mode is changed to the forced non-light emission mode. Then, when the flash 14 is moved from the non-light emission position to the light emission position in response to a user's operation, the light emission mode is changed back to the forced light emission mode.

Specifically, when the position of the flash 14 is moved from the non-light emission position to the light emission position, the light emission mode in a case where the flash 14 is last set at the light emission position is resumed. However, as long as the release button 21 is kept in the SW1 state (kept being half-pressed), the operation is not limited thereto. This point will be described below.

As described above, the user can set the light emission mode at any desired timing. The following descriptions are on the premise that the light emission mode has been set by the user before the release button 21 is set to the SW1 state (half press).

Referring back to FIG. 3, when it is determined that the current light emission mode is the forced non-light emission mode (YES in step S201), the processing proceeds to step S206. On the other hand, when it is determined that the present light emission mode is not the forced non-light emission mode (NO in step S201), the processing proceeds to step S202.

In step S202, the CPU 15 determines whether the preset light emission mode of the flash 14 is the forced light emission mode. Specifically, the CPU 15 determines whether the current light emission mode is the forced light emission mode. When it is determined that the light emission mode is the forced light emission mode (YES in step S202), the processing proceeds to step S205. On the other hand, when it is determined that the light emission mode is not the forced light emission mode (NO in step S202), the processing proceeds to step S203.

In step S203, the scene determination unit 25 determines whether the captured scene is a low-luminance scene based on the calculated subject's luminance value. The scene determination unit 25 determines whether the captured scene is a low-luminance scene based on the exposure time from among the set suitable exposure amount. In the present exemplary embodiment, when the exposure time is equal to or greater than a preset predetermined threshold value, the scene determination unit 25 determines that the captured scene is a low-luminance scene. The above-described predetermined threshold value may be any exposure time as long as the screen of the image data to be acquired does not entirely become dark.

When it is determined that the captured scene is a low-luminance scene, the exposure time needs to be comparatively long. In this case, therefore, an image with a blurred subject tends to be acquired because of the camera shake at image capturing. Specifically, in a low-luminance scene, the camera shake of the user has a large influence.

When it is determined that the captured scene is a low-luminance scene, the exposure time when capturing a subject's image while firing the flash 14 is set to a short time. Specifically, the exposure time is set so as to at least be shorter than the exposure time when capturing a subject's image without firing the flash 14. Setting a short exposure time enables suppressing the influence of the camera shake. Firing the flash 14 compensates for the exposure amount changed by changing the exposure time. The set exposure amount is employed for the processing in step S105 (described below).

Referring back to FIG. 3, when it is determined that the captured scene is a low-luminance scene (YES in step S203), the processing proceeds to step S205. On the other hand, when it is determined that the captured scene is not a low-luminance scene (NO in step S203), the processing proceeds to step S204.

In step S204, the scene determination unit 25 determines whether the target is a backlight scene based on the calculated subject's luminance value. The determination of a backlight scene according to the present exemplary embodiment will be described below. First of all, the scene determination unit 25 identifies the face area of a person from among subject areas. Then, the scene determination unit 25 determines a backlight scene based on the difference in luminance between the identified face area and other subject areas. When a plurality of persons is included in the subject, the above-described processing is performed on the face area of the main person.

When it is determined that the captured scene is a backlight scene (YES in step S204), the processing proceeds to step S205. On the other hand, when it is determined that the captured scene is not a backlight scene (NO in step S204), the processing proceeds to step S206.

The determination of a low-luminance scene and the determination of a backlight scene may be made by using well-known methods other than the above-described determination methods. For example, a backlight scene may be determined based on differences in luminance between the center portion and peripheral portions of image data, such as a through image acquired in advance.

In step S205, the light emission determination unit 26 makes light emission determination based on the determined light emission mode and the result of the captured scene determination. In the step S205, the light emission determination unit 26 determines that the flash 14 emits light. Then, the light emission determination unit 26 makes setting for emitting light the flash 14 based on the relevant determination result.

In step S206, similar to step S205, the light emission determination unit 26 makes the light emission determination based on the determined light emission mode and the result of the captured scene determination. In step S206, the light emission determination unit 26 determines that the flash 14 does not emit light (non-light emission). Then, the light emission determination unit 26 makes setting for not emitting light the flash 14 based on the relevant determination result. The necessity of firing of the flash 14 set in steps S205 and S206 is recorded in the memory 18.

When the light emission determination in steps S205 and S206 is completed, then in step S207, the light emission determination unit 26 ends the first light emission determination. Then, the processing returns to the flowchart illustrated in FIG. 2. The above completes description of the first light emission determination according to the present exemplary embodiment.

Referring back to FIG. 2, in step S105, the CPU 15 calculates the exposure amount (first exposure amount) at the time when imaging a subject based on such information as the suitable exposure amount and the result of the first light emission determination. The calculated exposure amount is recorded in the memory 18.

In step S106, the CPU 15 displays on the display unit 17 the exposure amount calculated in the processing in step S105, and the set information about the flash 14. The information about the flash 14 includes the result of the first light emission determination, a captured scene, and the current light emission mode. These pieces of information are displayed on the display unit 17 as image data, such as predetermined icons. When it is determined that the captured scene is a low-luminance scene, notes cautioning the camera shake are displayed on the display unit 17.

In step S107, the CPU 15 determines whether the release button 21 is set to the SW2 state (full press). Specifically, the CPU 15 determines whether the user has given an instruction to start capturing a subject's image. When it is determined that the release button 21 is set to the SW2 state (YES in step S107), the processing proceeds to step S112. On the other hand, when it is determined that the release button 21 is not set to the SW2 state (NO in step S107), the processing proceeds to step S108. In step S107, the CPU 15 may determine whether the release button 21 is currently in the SW2 state.

In step S108, the CPU 15 determines whether the release button 21 is kept in the SW1 state (kept being half-pressed). When it is determined that the release button 21 is not kept in the SW1 state (NO in step S108), the processing returns to step S101. In other words, when the user releases the half press of the release button 21, the processing returns to step S101.

On the other hand, when it is determined that the release button 21 is kept in the SW1 state (kept being half-pressed) (YES in step S108), the processing proceeds to step S109. In other words, when the user keeps half-pressing the release button 21, the processing proceeds to step S109.

The following describes a case where the automatic light emission mode is set before the release button 21 is changed to the SW1 state (half press). In other words, a case where the automatic light emission mode is preset will be described below.

When the automatic light emission mode is set before the user half-presses the release button 21, the result of the first light emission determination may differ from the user's intention. For example, in the automatic light emission mode, even when the first light emission determination is that the flash 14 does not emit light, the user may intend to emit light of the flash 14.

However, in the above-described case, the necessity of firing of the flash 14 cannot be changed unless a captured scene changes. In other words, when it is determined that the flash 14 does not emit light in a state where the automatic light emission mode is set, it is not possible to make setting for emitting light the flash 14 unless a captured scene changes.

Therefore, when it is determined that the flash 14 does not emit light in the automatic light emission mode, it is necessary to change the light emission mode to the forced light emission mode in order to emit light of the flash 14. However, since the user needs to perform a complicated operation so as to change the light emission mode, it takes time to make setting for emitting of the flash 14. In this case, the user may miss an opportunity to image capture a subject.

In the present exemplary embodiment, the CPU 15 (the position determination unit 24 and the light emission determination unit 26) determines whether the position of the flash 14 has been changed while the release button 21 is kept in the SW1 state (while being half-pressed). To cope with the above-described problem, the CPU 15 (the position determination unit 24 and the light emission determination unit 26) determines whether to emit light of the flash 14 according to the relevant result. In other words, to cope with the above-described problem, the CPU 15 performs the light emission determination again in response to changing the position of the flash 14 while half-pressing the release button 21. This processing will be described in detail below with reference to FIGS. 2 and 4.

Referring back to FIG. 2, in step S109, the position determination unit 24 determines whether the position of the flash 14 has been changed while the release button 21 is kept in the SW1 state (while being half-pressed). When it is determined that the position of the flash 14 has not been changed (NO in step S109), the processing returns to step S107. On the other hand, when it is determined that the position of the flash 14 has been changed (YES in step S109), the processing proceeds to step S110.

Figure 4:
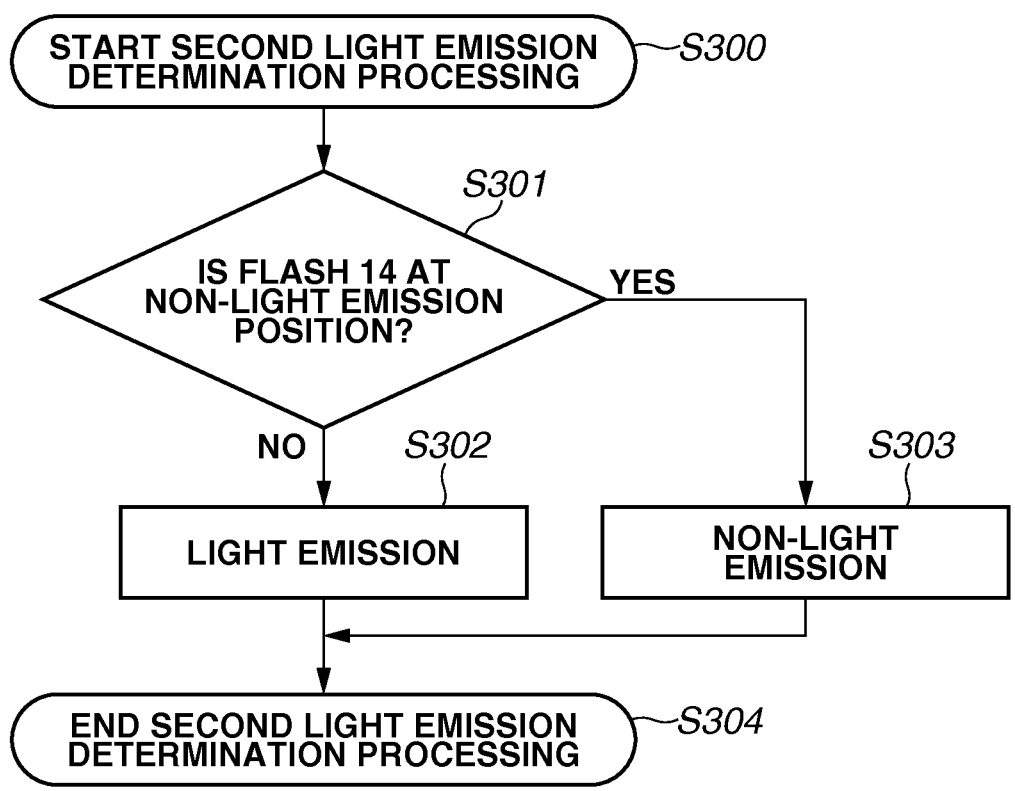
FIG. 4 is a flowchart illustrating second light emission determination by the digital camera that is an imaging apparatus according to the first exemplary embodiment of the present invention.

In step S110, the light emission determination unit 26 makes the second light emission determination. The second light emission determination will be described in detail below with reference to FIG. 4. FIG. 4 is a flowchart illustrating the second light emission determination of the camera 100 that is an imaging apparatus according to the first exemplary embodiment of the present invention. The flowchart illustrated in FIG. 4 will be described below. In step S300, the CPU 15 starts the second light emission determination. In step S301, the light emission determination unit 26 determines whether to emit light of the flash 14 is set at the non-light emission position based on information output from the position detection unit 23.

When it is determined that the flash 14 is set at the non-light emission position (YES in step S301), the processing proceeds to step S303. In other words, when it is determined that the flash 14 is set at the non-light emission position based on the information output from the position detection unit 23, the processing proceeds to step S303. On the other hand, when it is determined that the flash 14 is not set at the non-light emission position (NO in step S301), the processing proceeds to step S302. In other words, when it is determined that the flash 14 is set at the light emission position based on the information output from the position detection unit 23, the processing proceeds to step S302.

In step S302, the light emission determination unit 26 determines that the flash 14 emits light based on the result in step S301. Then, the light emission determination unit 26 makes setting for firing the flash 14 based on the relevant result, and records the relevant setting in the memory 18.

In step S303, the light emission determination unit 26 determines that the flash 14 does not emit light based on the result in step S301. Then, the light emission determination unit 26 makes setting for not firing the flash 14 based on the relevant result, and records the relevant setting in the memory 18.

As described above, the user changes again the position of the flash 14 after the first light emission determination has been performed. Therefore, it can be determined that the necessity of firing of the flash 14 determined by the second light emission determination is different from the user's intention. In other words, it can be determined that the necessity of firing of the flash 14 determined based on the captured scene is different from the necessity thereof intended by the user.

Therefore, when the flash 14 is moved to the non-light emission position in a state where in the first light emission determination, emitting light the flash 14 is set, in the second light emission determination it is determined that the user intends not to emit light the flash 14. Then, in the second light emission determination the setting of emitting light of the flash 14 is changed to the setting for not emitting light the flash 14.

Further, when the flash 14 is moved to the light emission position in a state where in the first light emission determination, not emitting light the flash 14 is set, in the second light emission determination it is determined that the user intends to emit light the flash 14. Then, in the second light emission determination the setting for emitting light of the flash 14 is changed to the setting for emitting light the flash 14.

As described above, in the second light emission determination according to the present exemplary embodiment it is determined whether to emit light of the flash 14, based on the position of the flash 14 determined based on the result of the position detection unit 23, regardless of a captured scene. The above is detailed description of the second light emission determination.

Referring back to FIG. 2, in step S111, the CPU recalculates the exposure amount at the time when capturing a subject's image based on the result of the second light emission determination. As described above, when performing the second light emission determination, the result of the first light emission determination may be changed. In this case, by changing the decision whether to emit light of the flash 14, the subject's luminance at imaging capturing changes.

In the processing in step S111, the CPU 15 recalculates the exposure amount (second exposure amount) for providing suitable luminance at the time when capturing a subject's image, based on the result of the second light emission determination. The calculated exposure amount is recorded in the memory 18.

The exposure amount calculated in step S111 is in such a way that the luminance of a subject to image to be captured under the conditions set in the first light emission determination is approximately equal to the luminance of a subject to image to be captured under the conditions set in the second light emission determination. The above-described configuration enables acquiring an image having preferable subject's luminance even in a case where only the necessity of emitting light of the flash 14 is changed by the user's intention.

Although, in the present exemplary embodiment, the exposure amount at the time when obtaining the image by capturing a subject's image after the second light emission determination is recalculated, the configuration is not limited thereto. For example, in the above-described processing in step S105, the CPU 15 calculates the exposure amount in a case where the flash 14 emits light and the exposure in a case where the flash 14 does not emit light. Either one of the two calculated exposure amounts may be selected according to whether to emit light of the flash 14.

When the exposure amount in step S111 has been calculated, the processing returns to step S106. In step S106, the CPU 15 displays on the display unit 17 the preset information about the flash 14 and information about the calculated exposure amount. Subsequently, the CPU 15 repeats the above-described processing until it is determined that the release button 21 is in the SW2 state in step S107.

In the present exemplary embodiment, even in a case where the second light emission determination is performed, the CPU 15 does not change the position of the photographic lens group 1 set in step S103 until the user releases the half-pressing of the release button 21. Specifically, when the user changes the position of the flash 14 while half-pressing the release button 21, the CPU changes only the necessity of emitting light of the flash 14 and the exposure amount.

Figure 5:
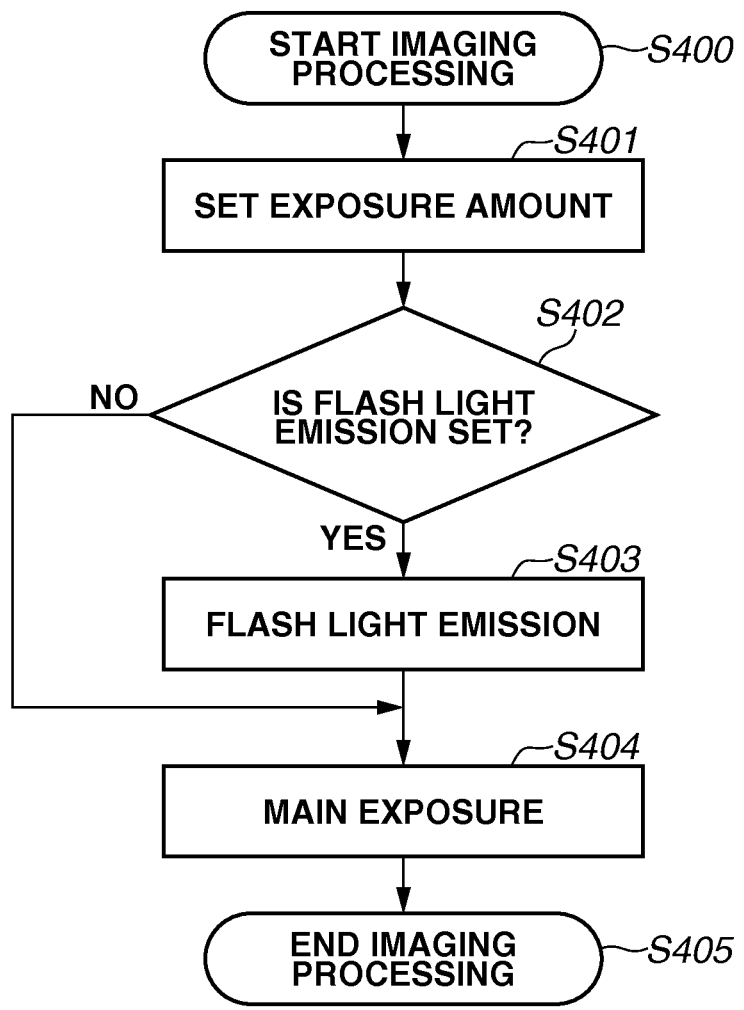
FIG. 5 is a flowchart illustrating the imaging processing by the digital camera that is an imaging apparatus according to the first exemplary embodiment of the present invention.

When it is determined that the release button 21 is full-pressed (SW2 state) (YES in step S107), then in step S112, the CPU 15 performs imaging processing. The imaging processing according to the present exemplary embodiment will be described below with reference to FIG. 5. FIG. 5 is a flowchart illustrating the imaging processing of the camera 100 that is an imaging apparatus according to the first exemplary embodiment of the present invention.

The flowchart illustrated in FIG. 5 will be described below. In step S400, the CPU 15 starts imaging processing. In step S401, the exposure control unit 11 reads the calculated exposure amount from the memory 18. In this case, when the second exposure amount is recorded, the CPU 15 reads the relevant second exposure amount. Then, according to the read exposure amount, the exposure control unit 11 controls operations of the diaphragm 2, the image sensor 3, and the analog front end (AFE) (not illustrated) to set to the camera 100 the exposure amount at the time when capturing a subject's image.

In step S402, the light emission determination unit 26 reads the result of the above-described first light emission determination or the result of the above-described second light emission determination from the memory 18. When the second light emission determination is in progress, the light emission determination unit 26 reads the result of the second light emission determination. Further, when the second light emission determination is not in progress, the light emission determination unit 26 reads the result of the first light emission determination. Then, the light emission determination unit 26 determines whether the read result is the setting for emitting light the flash 14. When it is determined that the relevant result is the setting for emitting light the flash 14 (YES in step S402), the processing proceeds to step S403. On the other hand, when it is determined that the relevant result is not the setting for emitting light the flash 14 (NO in step S402), the processing proceeds to step S404. In other words, when the relevant result is the setting for not emitting light the flash 14, the processing proceeds to step S404.

In step S403, the light emission control unit 13 reads the result of the light emission determination unit 26 from the memory 18, and emits the flash 14 based on the relevant result to illuminate the subject. In step S404, the image sensor 3 performs main exposure of the subject's optical image, and acquires the analog image data of the imaged subject.

The relevant analog image data is converted into digital image data by the A/D conversion unit 4, subjected to various types of image processing, and recorded in the memory 18 and the recording medium 40. The digital image data of the subject has been recorded in the memory 18 and the recording medium 40, and then in step S405, the CPU 15 ends imaging processing. The above is detailed description of the imaging processing according to the present exemplary embodiment.

Referring aback to FIG. 2, in step S113, the CPU reads the digital image data acquired in imaging processing from the memory 18. Then, the CPU 15 performs D/A conversion on the read digital image data, converts it into a display image, and displays the relevant image on the display unit 17.

In step S114, the CPU 15 determines whether subsequent imaging is to be carried on. When it is determined that the subsequent imaging is carried on (YES in step S114), the processing returns to step S101. On the other hand, when it is determined that imaging is ended (NO in step S114), then in step S115, the CPU 15 ends all of processing related to the imaging. The above is detailed description of the imaging processing according to the present exemplary embodiment.

As described above, the camera 100 according to the present exemplary embodiment performs the first light emission determination in response to a user's operation for setting the release button 21 to the SW1 state (half press). In the first light emission determination, it is determined whether to emit light of the flash 14, based on the captured scene and the position of the flash 14 at the time when the camera 100 has been instructed to prepare for capturing a subject's image. Further, the camera 100 performs the second light emission determination in response to a user's operation for changing the position of the flash 14 while keeping the release button 21 in the SW1 state (while being half-pressed). Then, in the second light emission determination, it is determined whether to emit light of the flash 14, based on the position of the flash 14 regardless of a captured scene.

Even when the automatic light emission mode is set, the above-described configuration enables controlling the emitting of the flash 14 in consideration of the user's intention when capturing a subject's image. Therefore, even in a case where the imaging apparatus automatically performs the light emission determination according to a captured scene, the camera 100 according to the present exemplary embodiment can control the emitting of the flash 14 in consideration of the user's intention.

Although, in the present exemplary embodiment, the flash 14 is configured to be able to move to the light emission position and the non-light emission position through a user's manual operation, the configuration is not limited thereto. For example, the flash 14 may be configured to be automatically moved based on the result of the first light emission determination in the automatic light emission mode. In this case, the CPU 15 controls the drive of driving members (not illustrated) for moving the flash 14 so as to enable moving the position of the flash 14.

In the second light emission determination, it is determined whether the position of the flash 14 once automatically changed through the first light emission determination has been changed through a user's manual operation. Even with this configuration, it is possible to control the emitting of the flash 14 in consideration of the user's intention while controlling the emitting of the flash 14 based on a captured scene.

In the second exemplary embodiment of the present invention, a case will be described below where the light emission mode is changed by the user while the release button 21 is kept in the SW1 state (while being half-pressed), with reference to FIGS. 6 to 8. The basic configuration of the camera 100 is similar to that in the above-described first exemplary embodiment, and redundant description thereof will be omitted. In the present exemplary embodiment, data such as programs for instructing similar operations to the flowcharts illustrated in FIGS. 6 to 8 is stored in the memory 18.

Imaging processing according to the present exemplary embodiment will be described below with reference to FIG. 6. FIG. 6 is a flowchart illustrating the imaging processing of the camera 100 that is an imaging apparatus according to the second exemplary embodiment of the present invention. The processing in steps S500 to S503 is similar to the processing in steps S100 to S103 described in the first exemplary embodiment, and redundant descriptions thereof will be omitted.

Figure 6:
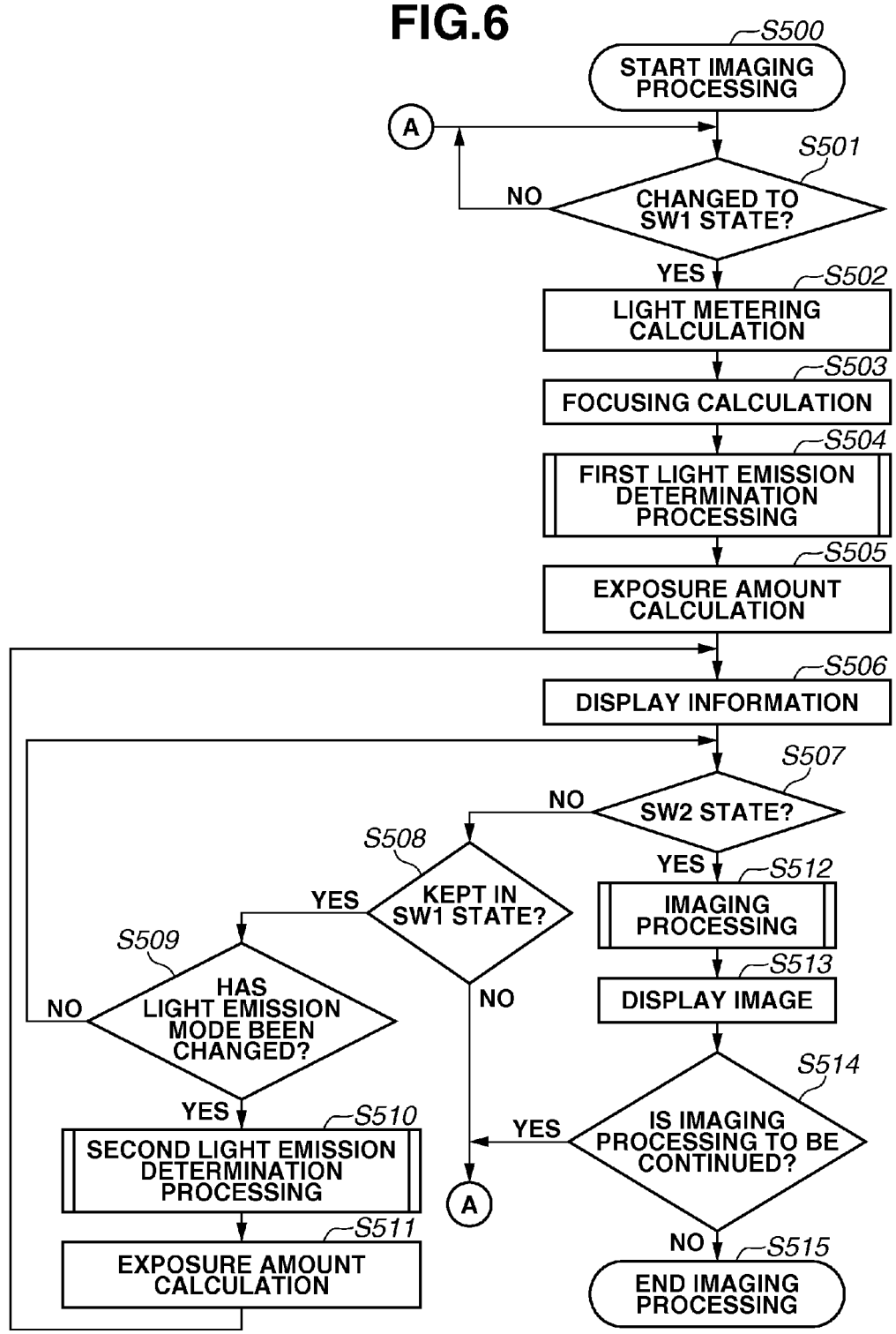
FIG. 6 is a flowchart illustrating the imaging by a digital camera that is an imaging apparatus according to a second exemplary embodiment of the present invention.
Figure 7:
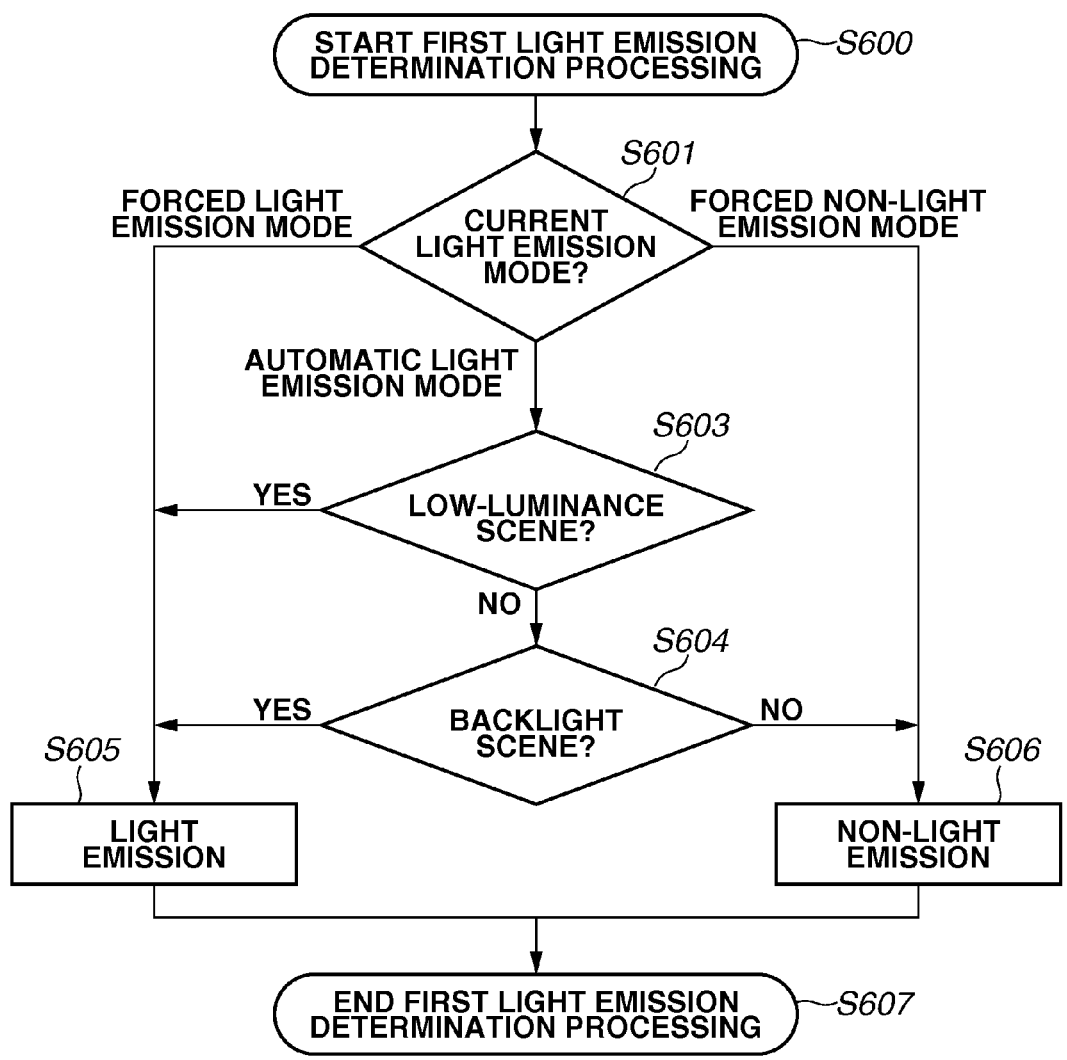
FIG. 7 is a flowchart illustrating first light emission determination by the digital camera that is an imaging apparatus according to the second exemplary embodiment of the present invention.

Referring to FIG. 6, in step S504, the CPU 15 performs the first light emission determination about whether to emit light of the flash 14 at the time when capturing a subject's image. The first light emission determination according to the present exemplary embodiment will be described below with reference to FIG. 7. FIG. 7 is a flowchart illustrating the first light emission determination of the camera 100 that is an imaging apparatus according to the second exemplary embodiment of the present invention.

The flowchart illustrated in FIG. 7 will be described below. In step S600, the CPU 15 starts the first light emission determination. In step S601, the CPU 15 determines which of the forced light emission mode, the forced non-light emission mode, and the automatic light emission mode (first mode) is set as the currently set light emission mode of the flash 14. In the present exemplary embodiment, the forced light emission mode and the forced non-light emission mode are collectively referred to as forced setting mode (second mode).

In the automatic light emission mode (first mode) according to the present exemplary embodiment, the CPU 15 determines whether to emit light of the flash 14, based on a captured scene. In the forced setting mode (second mode) according to the present exemplary embodiment, the CPU 15 emits light or does not emit light of the flash 14 regardless of a captured scene. In other words, in the forced setting mode, the CPU 15 forcibly emits light or does not emit light of the flash 14. Similar to the above-described first exemplary embodiment, a case will be described below where the light emission mode of the flash 14 is preset before the user sets the release button 21 to the SW1 state (half press). Specifically, the processing in step S601 is performed in order to determine the preset light emission mode before the user instructs the camera 100 to prepare for capturing a subject's image.

When it is determined that the currently set light emission mode is the forced light emission mode (FORCED LIGHT EMISSION MODE in step S601), the processing proceeds to step S605. On the other hand, when it is determined that the currently set light emission mode is the forced non-light emission mode (FORCED NON-LIGHT EMISSION MODE in step S601), the processing proceeds to step S606. On the other hand, when it is determined that the currently set light emission mode is the automatic light emission mode (AUTOMATIC LIGHT EMISSION MODE in step S601), the processing proceeds to step S603. The processing in subsequent steps S603 to S607 is similar to that according to the above-described first exemplary embodiment, and redundant descriptions thereof will be omitted.

As described above, in the first light emission determination according to the present exemplary embodiment, it is determined whether to emit light of the flash 14, based on the preset light emission mode. Only when the preset light emission mode is the automatic light emission mode, in the first light emission determination, it is determined whether to emit light of the flash 14, based on a captured scene. The above is detailed description of the first light emission determination according to the present exemplary embodiment.

Referring back to FIG. 6, the processing in steps S505 to S508 is similar to the above-described processing in steps S105 to S108 in the first exemplary embodiment, and redundant descriptions thereof will be omitted. In step S509, the CPU 15 determines whether the light emission mode has been changed while the release button 21 is kept in the SW1 state (first state). In other words, the CPU 15 determines whether the user has changed the light emission mode while half-pressing the release button 21.

As described above in the first exemplary embodiment, the light emission mode is changed through a user's operation on the operation unit (mode setting unit) 20. If a mode setting dial for setting the light emission mode is provided, for example, the light emission mode may be changed through a user's operation on the relevant mode setting dial.

When it is determined that the light emission mode has not been changed (NO in step S509), the processing returns to step S507. In step S507, the CPU 15 repeats the above-described processing until the release button 21 is full-pressed (SW2 state). On the other hand, when it is determined that the light emission mode has been changed (YES in step S509), then in step S510, the CPU 15 makes the second light emission determination.

The second light emission determination according to the present exemplary embodiment will be described below with reference to FIG. 8. FIG. 8 is a flowchart illustrating the second light emission determination of the camera 100 that is an imaging apparatus according to the second exemplary embodiment of the present invention. The flowchart illustrated in FIG. 8 will be described below. In step S700, the CPU 15 starts the second light emission determination. In step S701, the light emission determination unit 26 determines the light emission mode after change. In other words, the light emission determination unit 26 determines whether the light emission mode after change is the forced light emission mode, the forced non-light emission mode, or the automatic light emission mode. The light emission mode after change refers to the light emission mode changed by the user while the release button 21 is kept in the SW1 state. In other words, it is the light emission mode which is changed at the time when the user operates the operation unit 20 while half-pressing the release button 21.

When it is determined that the light emission mode after change is the forced light emission mode (FORCED LIGHT EMISSION MODE in step S701), the processing proceeds to step S703. On the other hand, when it is determined that the light emission mode after change is the forced non-light emission mode (FORCED NON-LIGHT EMISSION MODE in step S701), the processing proceeds to step S704. On the other hand, when it is determined that the light emission mode after change is the automatic light emission mode (AUTOMATIC LIGHT EMISSION MODE in step S701), the processing proceeds to step S702.

In step S702, the light emission determination unit 26 determines whether the light emission mode before change is the forced light emission mode or the forced non-light emission mode. The light emission mode before change refers to the above-described light emission mode determined in step S601. In other words, the light emission mode before change is the light emission mode preset before the user half-presses the release button 21.

When it is determined that the light emission mode before change is the forced non-light emission mode (FORCED NON-LIGHT EMISSION MODE in step S702), the processing proceeds to step S703. On the other hand, when it is determined that the light emission mode before change is the forced light emission mode (FORCED LIGHT EMISSION MODE in step S702), the processing proceeds to step S704.

In step S703, the light emission determination unit 26 makes setting for emitting light the flash 14 based on the determination results in steps S701 and S702. In step S704, the light emission determination unit 26 makes setting for not emitting light the flash 14 based on the determination results in steps S701 and S702.

When the processing in steps S703 and S704 is completed, then in step S705, the CPU 15 ends the second light emission determination. Then, the processing returns to the flowchart illustrated in FIG. 6. The processing in steps S511 to S515 is similar to that in the above-described first exemplary embodiment, and redundant descriptions thereof will be omitted. The above is detailed description of imaging according to the present exemplary embodiment.

As described above, in the present exemplary embodiment, when the light emission mode after change is the automatic light emission mode, the CPU 15 determine whether to emit light of the flash 14, based on the light emission mode before change. The above-described processing in step S702 is performed in a case where the preset light emission mode, i.e., the forced setting mode (second mode) is changed to the automatic light emission mode (first mode) while the release button 21 is kept in the SW1 state.

In the second light emission determination, when the light emission mode before change is the forced non-light emission mode, the light emission determination unit 26 makes setting for emitting light the flash 14 in the automatic light emission mode after change. When the light emission mode before change is the forced light emission mode, the light emission determination unit 26 makes setting for not emitting light the flash 14 in the automatic light emission mode after change.

Specifically, when the user changes the light emission mode while half-pressing the release button 21, the CPU 15 sets the necessity of emitting of the flash 14 contrary to the necessity of emitting of the flash 14 set in the light emission mode before change.

This configuration enables changing only the necessity of emitting of the flash 14 without newly performing light metering calculation and focusing calculation, when the result of the first light emission determination differs from the necessity of emitting of the flash 14 intended by the user. Further, since the light emission mode after change is set to the automatic light emission mode, the light emission determination can be performed based on a captured scene when performing the following imaging.

Therefore, even in a case where the user changes the light emission mode from the forced setting mode to the automatic light emission mode while keeping the release button 21 in the SW1 state, the CPU 15 can determine the necessity of emitting of the flash 14 at the time when capturing a subject's image in consideration of the user's intention. In other words, even in a case where the necessity of emitting light is automatically determined based on a captured scene, the CPU 15 can set the necessity of emitting of the flash 14 intended by the user.

Although, in the present exemplary embodiment, the flash 14 is movable to the non-light emission position and the light emission position, the configuration is not limited thereto. For example, the flash 14 may be fixed to a position at which the subject can be illuminated. In other words, the flash 14 may be configured not to change its position (not to move). The second light emission determination according to the present exemplary embodiment is performed in response to a user's operation for changing the light emission mode. Therefore, even if the flash 14 is fixed, the CPU 15 can change only the necessity of emitting of the flash 14 when the user changes the light emission mode while half-pressing the release button 21.

While the present invention has specifically been described based on the above-described exemplary embodiments, the present invention is not limited thereto but can be modified in diverse ways without departing from the spirit and scope thereof. For example, although the above-described exemplary embodiments have specifically been described based on a case where a still image is acquired by capturing a subject's image, the configuration is not limited thereto. The present invention may be employed in a case where a moving image is acquired.

Although, in the present invention, operations of respective units in the camera 100 are controlled by the exposure control unit 11, the lens control unit 12, the light emission control unit 13, the CPU 15, and the image processing unit 16, the configuration is not limited thereto. For example, the above-described programs according to the flowcharts illustrated in FIGS. 2 to 8 may be prestored in memory 18, and the CPU 15 may execute the relevant programs to control the drive of each unit in the camera 100.

Although, in the above-described exemplary embodiments, the digital camera 100 has specifically been described as an example imaging apparatus according to the present invention, the configuration is not limited thereto. For example, the present invention is applicable to devices other than a digital camera as an imaging apparatus as long as it includes a light emission unit like the flash 14. For example, the present invention may be employed in a mobile phone and a tablet terminal including a digital camcorder and a smart phone. Further, the present invention is applicable to diverse types of imaging apparatuses without departing from the spirit and scope thereof.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-251247 filed Dec. 4, 2013, which is hereby incorporated by reference herein in its entirety.

What is claimed is:

1. An imaging apparatus comprising:
    a light emitter configured to move between a light emission position and a non-light emission position;
    an instruction device configured to change, in response to a user's manual operation, to a first state for giving an instruction to prepare for capturing a subject's image; and
    a light emission determination unit implemented by a processor and configured to make a light emission determination,
    wherein, in response to setting the instruction device to the first state, the light emission determination unit makes the light emission determination based on a captured scene, and
    wherein, in response to setting the instruction device to the first state and in a case where the light emission determination unit determines that the light emitter does not emit light, the light emission determination unit determines that the light emitter emits light regardless of predetermined setting of a light emission mode of the light emitter, in response to a user's operation for moving the light emitter to the light emission position while the instruction device is kept in the first state.

2. The imaging apparatus according to claim 1, further comprising:
    a position detector configured to detect a position of the light emitter; and
    a scene determination unit implemented by a processor and configured to determine a captured scene,
    wherein, in response to setting the instruction device to the first state, the light emission determination unit makes first light emission determination based on a result of the position detector and a result of the scene determination unit.

3. The imaging apparatus according to claim 2,
    wherein the light emission determination unit makes second light emission determination based only on the result of the position detector in response to a user's operation for moving the light emitter while the instruction device is kept in the first state, and
    wherein, in a case where the light emission determination unit can determine that the light emitter is set at the light emission position based on the result of the position detector in the second light emission determination, the light emission determination unit determines that the light emitter emits light.

4. The imaging apparatus according to claim 3, further comprising:
    a position changer configured to instruct a movement of the light emitter between the non-light emission position and the light emission position through a user's manual operation,
    wherein the light emission determination unit performs the second light emission determination in response to a user's operation on the position changer while the instruction device is kept in the first state.

5. The imaging apparatus according to claim 4, wherein, in response to a user's operation on the position changer, the light emitter can move between the light emission position projected from the imaging apparatus and the non-light emission position stored in the imaging apparatus.

6. The imaging apparatus according to claim 3, wherein, in a case where the light emission determination unit can determine that the light emitter is set at the non-light emission position based on the result of the position detector in the second light emission determination, the light emission determination unit determines that the light emitter does not emit light.

7. The imaging apparatus according to claim 3, further comprising:
    a light emission control unit implemented by a processor and configured to control emitting of the light emitter based on the result of the light emission determination unit,
    wherein, in a case where a user's operation for moving the light emitter is not performed while the instruction device is kept in the first state, the light emission control unit sets whether to emit light of the light emitter, based on the result of the first determination of the light emission determination unit.

8. The imaging apparatus according to claim 3 further comprising:
    an exposure control unit implemented by a processor and configured to set an exposure amount for capturing a subject's image,
    wherein, in a case where the result of the first light emission determination differs from the result of the second light emission determination, the exposure control unit sets the exposure amount based on the result of the second light emission determination.

9. The imaging apparatus according to claim 1, wherein the instruction device changes to the first state in response to a user's manual operation on the instruction device with a first operation amount,
    wherein the instruction device changes to second state, different from the first state, in response to a user's manual operation on the instruction device with a second operation amount which is larger than the first operation amount, and wherein the second state is a state for giving an instruction to start capturing a subject's image.

10. An imaging apparatus comprising:
a light emitter configured to move between a light emission position and a non-light emission position;
an instruction device configured to change, in response to a user's manual operation, to a first state for giving an instruction to prepare for capturing a subject's image;
a position detector configured to detect a position of the light emitter;
a position determination unit implemented by a processor and configured to determine, based on a result of the position detector, whether the position of the light emitter has been changed;
a scene determination unit implemented by a processor and configured to determine a captured scene; and
a light emission determination unit implemented by a processor and configured to perform light emission determination about whether to emit light of the light emitter,
wherein, in response to setting the instruction device to the first state, the light emission determination unit makes first light emission determination based on the result of the position detector and a result of the scene determination unit,
wherein, in response to determination of the position determination unit that the position of the light emitter has been changed while the instruction device is kept in the first state, the light emission determination unit makes second light emission determination based on the result of the position detector regardless of the result of the scene determination unit, and
wherein, in a case where the light emission determination unit determined that the light emitter does not emit light in the first light emission determination, the light emission determination unit determines that the light emitter emits light when capturing a subject's image in the second light emission determination.

11. A method for controlling an imaging apparatus having a light emitter configured to move between a light emission position and a non-light emission position, and an instruction device configured to change, in response to a user's manual operation, to a first state for giving an instruction to prepare for capturing a subject's image, the method comprising:
making a light emission determination,
wherein, in response to setting the instruction device to the first state, making the light emission determination includes making the light emission determination based on a captured scene, and
wherein, in response to setting the instruction device to the first state and in a case where the light emission determination determines that the light emitter does not emit light, the light emission determination determines that the light emitter emits light regardless of predetermined setting of a light emission mode of the light emitter, in response to a user's operation for moving the light emitter to the light emission position while the instruction device is kept in the first state.

12. A non-transitory recording medium recording a program to cause a computer to perform a method for controlling an imaging apparatus having a light emitter configured to move between a light emission position and a non-light emission position, and an instruction device configured to change, in response to a user's manual operation, to a first state for giving an instruction to prepare for capturing a subject's image, the method comprising:
making a light emission determination,
wherein, in response to setting the instruction device to the first state, making the light emission determination includes making the light emission determination based on a captured scene, and
wherein, in response to setting the instruction device to the first state and in a case where the light emission determination determines that the light emitter does not emit light, the light emission determination determines that the light emitter emits light regardless of predetermined setting of a light emission mode of the light emitter, in response to a user's operation for moving the light emitter to the light emission position while the instruction device is kept in the first state.

13. A method for controlling an imaging apparatus having a light emitter configured to move between a light emission position and a non-light emission position, and an instruction device configured to change, in response to a user's manual operation, to a first state for giving an instruction to prepare for capturing a subject's image, the method comprising:
detecting a position of the light emitter;
determining, based on a result of detecting the position of the light emitter, whether the position of the light emitter has been changed;
determining a captured scene; and
performing light emission determination about whether to emit light of the light emitter,
wherein, in response to setting the instruction device to the first state, performing the light emission determination includes making first light emission determination based on the result of detecting the position of the light emitter and a result of determining the captured scene,
wherein, in response to determining that the position of the light emitter has been changed while the instruction device is kept in the first state, performing the light emission determination, includes making second light emission determination based on the result of determining that the position of the light emitter regardless of the result of determining the captured scene, and
wherein, in a case where it is determined that the light emitter does not emit light in the first light emission determination, performing light emission determination determines that the light emitter emits light when capturing a subject's image in the second light emission determination.

14. A non-transitory recording medium recording a program to cause a computer to perform a method for controlling an imaging apparatus having a light emitter configured to move between a light emission position and a non-light emission position, and an instruction device configured to change, in response to a user's manual operation, to a first state for giving an instruction to prepare for capturing a subject's image, the method comprising:
detecting a position of the light emitter;
determining, based on a result of detecting the position of the light emitter, whether the position of the light emitter has been changed;
determining a captured scene; and
performing light emission determination about whether to emit light of the light emitter,
wherein, in response to setting the instruction device to the first state, performing the light emission determination includes making first light emission determination based on the result of detecting the position of the light emitter and a result of determining the captured scene, wherein, in response to determining that the position of the light emitter has been changed while the instruction device is kept in the first state, performing the light emission determination includes making second light emission determination based on the result of determining that the position of the light emitter regardless of the result of determining the captured scene, and wherein, in a case where it is determined that the light emitter does not emit light in the first light emission determination, performing light emission determination determines that the light emitter emits light when capturing a subject's image in the second light emission determination.

* * * * *